(12) United States Patent
Li et al.

(10) Patent No.: US 11,774,344 B2
(45) Date of Patent: Oct. 3, 2023

(54) NANOPARTICLE RECOGNITION DEVICE AND METHOD BASED ON DETECTION OF SCATTERED LIGHT WITH ELECTRIC DIPOLE ROTATION

(71) Applicants: ZHEJIANG LAB, Zhejiang (CN); ZHEJIANG UNIVERSITY, Zhejiang (CN)

(72) Inventors: Cuihong Li, Hangzhou (CN); Yuanyuan Ma, Hangzhou (CN); Zhaoxiong He, Hangzhou (CN); Shaochong Zhu, Hangzhou (CN); Zhiming Chen, Hangzhou (CN); Huizhu Hu, Hangzhou (CN)

(73) Assignees: ZHEJIANG LAB, Hangzhou (CN); ZHEJIANG UNIVERSITY, Hangzhou (CN)

( * ) Notice: Subject to any disclaimer, the term of this patent is extended or adjusted under 35 U.S.C. 154(b) by 42 days.

(21) Appl. No.: 17/553,841

(22) Filed: Dec. 17, 2021

(65) Prior Publication Data
US 2022/0196539 A1   Jun. 23, 2022

(30) Foreign Application Priority Data
Dec. 23, 2020  (CN) .......................... 202011542755.6

(51) Int. Cl.
 *G01N 15/14* (2006.01)
(52) U.S. Cl.
 CPC . *G01N 15/1434* (2013.01); *G01N 2015/1438* (2013.01); *G01N 2015/1493* (2013.01)

(58) Field of Classification Search
None
See application file for complete search history.

(56) References Cited

U.S. PATENT DOCUMENTS

| 2007/0046934 | A1* | 3/2007 | Roy | G01J 3/4338 |
| | | | | 356/318 |
| 2008/0055596 | A1* | 3/2008 | Tan | G01N 21/1717 |
| | | | | 356/139.05 |
| 2015/0111199 | A1* | 4/2015 | Hart | G01N 21/59 |
| | | | | 436/86 |

(Continued)

FOREIGN PATENT DOCUMENTS

CN       108645751 A  * 10/2018  ............. G01N 11/00

*Primary Examiner* — Rufus L Phillips
(74) *Attorney, Agent, or Firm* — W&G Law Group

(57) ABSTRACT

The present application discloses a nanoparticle recognition device and method based on detection of scattered light with electric dipole rotation. According to the scattering model of nanoparticles, the in situ detection of particle morphology in an optical trap is realized by the methods of particle suspension control and scattered light detection and separation. Specifically, two linearly polarized laser beams are used, wherein the first laser beam suspends nanoparticles and rotates nanoparticles by adjusting the polarization direction; the polarization direction of the second linearly polarized light is unchanged, and scattered light in a specific dipole direction is excited; the change of the polarizability of the nanoparticles is deduced by monitoring the change of the light intensity of the scattered light excited by the second laser beam at the fixed position, so that particle morphology recognition is realized.

4 Claims, 2 Drawing Sheets

(56) References Cited

U.S. PATENT DOCUMENTS

| | | | | |
|---|---|---|---|---|
| 2015/0116702 A1* | 4/2015 | Matsumoto | ............... | G01T 1/18 |
| | | | | 356/237.5 |
| 2016/0146732 A1* | 5/2016 | Freitag | ............... | G01N 15/1436 |
| | | | | 356/338 |
| 2018/0059039 A1* | 3/2018 | Li | ........................ | G01N 24/006 |
| 2020/0116623 A1* | 4/2020 | Cooper-Roy | ...... | G01N 21/6404 |
| 2020/0230602 A1* | 7/2020 | Yao | .................... | G01N 15/1475 |
| 2021/0109035 A1* | 4/2021 | Takagi | ............... | G01N 21/4788 |

\* cited by examiner

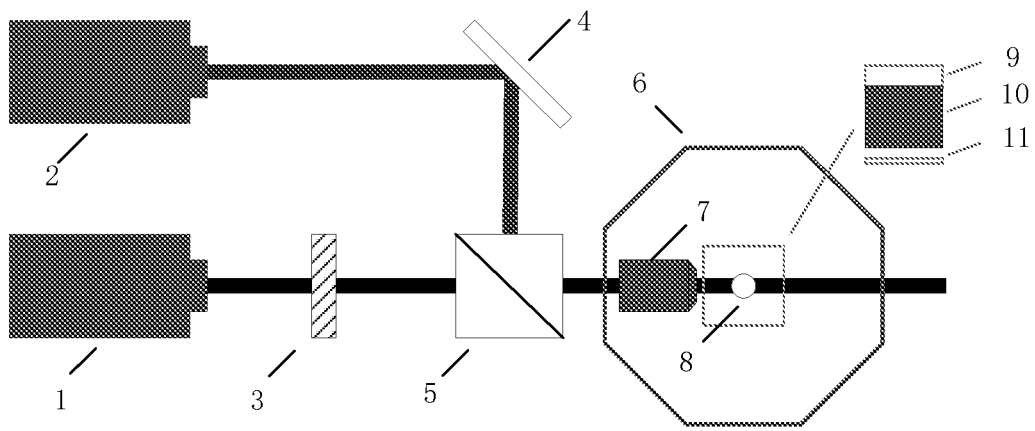

FIG. 1

```
Delivering target nanoparticles and
suspending in the optical trap
              │
              ▼
Adjusting the polarization direction of the first laser, and
simultaneously detecting the change of the scattered light
intensity of the particles to the second laser
              │
              ▼
Inverting the configuration structure of particles
according to the change of scattered
light intensity of the particles
              │
              ▼
Inferring configuration and
number of the particles
```

FIG. 2

NANOPARTICLE RECOGNITION DEVICE AND METHOD BASED ON DETECTION OF SCATTERED LIGHT WITH ELECTRIC DIPOLE ROTATION

CROSS-REFERENCE TO RELATED APPLICATIONS

The present application claims priority to Chinese Patent Application No. 202011542755.6, filed on Dec. 23, 2020, the content of which is incorporated herein by reference in its entirety.

TECHNICAL FIELD

The present application relates to the technical fields of material detection and vacuum optical tweezers, in particular to a nanoparticle recognition device and a method based on detection of scattered light with electric dipole rotation.

BACKGROUND

Optical tweezers technology, as a general tool for capturing and manipulating neutral particles, has been widely studied and applied in molecular biology, nanotechnology and experimental physics since it was initiated by Arthur Ashkin in 1970s. In the Optical tweezers technology, a laser beam is used to suspend particles, and it can be understood by a harmonic oscillator model. Compared with traditional oscillator models, the optical tweezers technology has no contact mechanical dissipation. Further, unlike the optical tweezers system in a liquid or an air medium, the optical tweezers system operating in vacuum can completely isolate a suspension unit from the environment. Based on the above advantages, the vacuum optical tweezers technology is applied in basic physics such as thermodynamics, quantum physics and sensing fields. Scientists in the field of physics have done a lot of research on vacuum optical tweezers.

At present, most of the sensitive units used in precision sensing and basic physics research based on the technology of optical tweezers in vacuum are single nanoparticles. The conventional steps of nanoparticles delivery in an optical tweezers in vacuum are as follows: a particle suspension is atomized and sprayed to the optical trap area, and the optical trap formed by laser randomly traps atomized droplets entering the trap. Therefore, the number of trapped particles is very random, and the key step before application is to identify whether the trapped nanoparticles are single particles. Because of the small size of nanoparticles, the direct imaging methods of nanoparticles are based on electron beam scanning or atomic force microscopy, but the existing scanning technologies are incompatible with the optical trap platform. The actual scheme adopted by the workers is that the vacuum degree of the optical trap is adjusted to be around 10 mbar, and the damping rate and resonant frequency of the particles in the optical trap are measured by detecting the displacement signal of the particles in the optical trap, and then the size of the particles is calculated according to a thermodynamic formula to determine whether the nanoparticles meet the requirements. In terms of efficiency, since most of the existing particle delivery methods are implemented under a room pressure, this measurement method in vacuum needs frequent vacuumization and recovery time consumption; in terms of parameter measurement, the measurement accuracy of this method depends on the accurate measurement of the molecular radius, vacuum degree and beam waist size of the optical trap.

SUMMARY

In view of the shortcomings of the prior art, the present application provides a nanoparticle recognition device and method based on detection of scattered light with electric dipole rotation, and the specific technical solution is as follows:

A device for recognizing nanoparticles based on detection of scattered light with electric dipole rotation, wherein the device comprises a first laser, a second laser, a polarization adjuster, a plane mirror, a beam combiner, a vacuum cavity, an objective lens, a photodetector, an objective lens, and a filter;

the first laser emits trapping laser, which enters the beam combiner after passing through the polarization adjuster; the second laser emits probe laser, which enters the beam combiner after being reflected by the plane mirror, the trapping laser and the probe laser are combined by the beam combiner and then enter the objective lens located in the vacuum cavity, and are converged by the objective lens to form an optical trap to trap nanoparticles; the scattered light irradiated by the nanoparticles is filtered by the filter to remove the scattered light excited by the first laser, and only the scattered light excited by the second laser is recorded, and is then converged by a lens group to be detected by the photodetector.

Furthermore, a ratio of a power of the first laser to a power of the second laser is greater than 10.

Furthermore, the polarization modulator is preferably a half-wave plate, and the polarization direction of the trapping laser is adjusted by adjusting the half-wave plate.

A method for recognizing nanoparticles based on detection of scattered light with electric dipole rotation, specifically comprising the following steps:

(1) converging trapping laser and probe laser to be irradiated into a vacuum cavity to form an optical trap for suspending target nanoparticles to be measured;

(2) adjusting a polarization direction of the trapping laser to make the nanoparticles rotate in the optical trap, filtering scattered light irradiated by the nanoparticles to remove the trapping laser, and recording a change of a light intensity of the scattered light excited by the probe laser at a fixed position;

(3) according to a nanoparticle scattering model and an optical transmission efficiency of a system, if the polarization direction is changed and an error of a change rate of the light intensity of the scattered light of the particles does not exceed 10%, identifying the particles as single spheres, and calculating an effective diameter of the particles by a Rayleigh scattering model; if the polarization direction is changed, the change rate of the light intensity of the scattered light of the particles exceeds 10%, then identifying the particles as non-spheres, and inverting a morphology and a size of the particles according to periodic characteristics of the fluctuation of scattered light;

a ratio of the light intensity of the trapping laser to that of the probe laser is not less than 10.

Furthermore, when the nanoparticles to be detected are silica particles, a wavelength of the first laser is 1064 nm and a wavelength of the second laser is 532 nm.

The present application has the following beneficial effects:

(1) The nanoparticle recognition method provided by the present application can be realized under a room pressure.

Compared with the optical tweezers technology in vacuum, this method can realize the real-time detection of trapped particles, and avoid vacuumizing, vacuum detection and particle displacement signal processing, thereby simplify the steps required for particle recognition and detection, saving time and reducing the complexity of the device, which is beneficial to the practical popularization and application of this technology.

(2) In the prior art, the trapping light is usually in the infrared band with a long wavelength, and is invisible to the naked eye. The method of particle trapping and band separation for scattered light detection adopted by the present application provides more choices for wavelength for particle detection. According to the scattering model, the scattered light intensity of particles increases with the decrease of the wavelength of incident light. By selecting a probe light with a shorter wavelength, the scattered light intensity can be improved, thereby improving the resolution and realizing observation of the scattered light in a visible light band.

(3) Compared with Scanning Electron Microscopy (SEM) \Atomic Force Microscopy (AFM), the present application provides a low-cost method for detecting the agglomeration of nanoparticles in the research and development industry of nanoparticles.

BRIEF DESCRIPTION OF DRAWINGS

FIG. 1 is a schematic diagram of a nanoparticle recognition device of the present application;

FIG. 2 is a flow chart of the nanoparticle recognition method of the present application;

DESCRIPTION OF EMBODIMENTS

Figure 3:
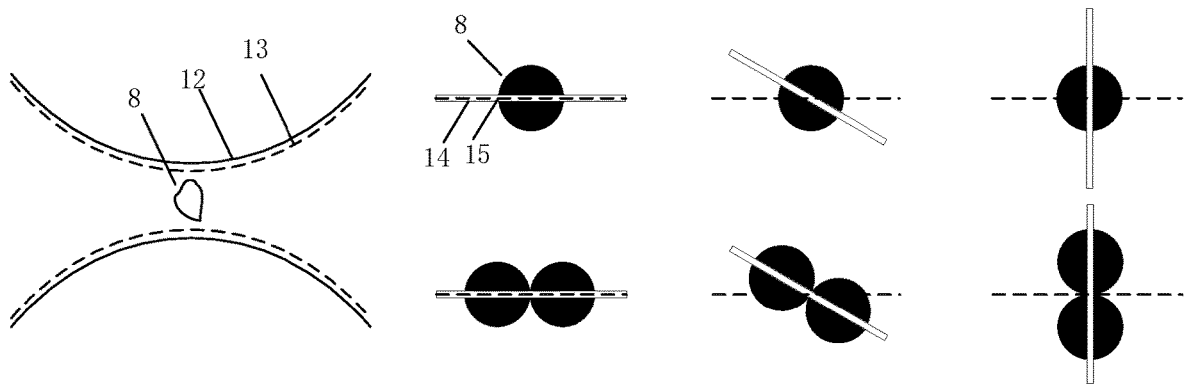
FIG. 3 is a schematic diagram of the nanoparticle recognition method of the present application.

The purpose and effect of the present application will become clearer from the following detailed description of the present application according to the drawings and preferred embodiments. It should be understood that the specific embodiments described here are only used to explain, not to limit, the present application.

By taking the recognition of silica nanoparticles as an example, as shown in FIG. 1, the nanoparticle recognition device based on the detection of scattered light with electric dipole rotation of the present application includes a first laser 1, a second laser 2, a half-wave plate 3, a plane mirror 4, a beam combiner 5, a vacuum chamber 6, an objective lens 7, nanoparticles 8, a photodetector 9, an objective lens 10 and a filter 11.

Wherein, the trapping laser of 1064 nm emitted by the first laser 1 enters the beam combiner 5 after passing through half-wave plate 3, the probe laser of 532 nm emitted by the second laser 2 passes through the plane mirror 4, and the laser emitted by the first laser 1 is combined by the beam combiner 5; the combined light enters the vacuum chamber 6, and is converged by the objective lens 7 located in the vacuum chamber 6 to form an optical trap to trap the nanoparticles 8. The scattered light irradiated by the nanoparticles 8 is filtered by the filter 11 to remove the scattered light excited by the first laser 1, and only the scattered light excited by the laser of 532 mn is recorded, and is then converged by a lens group 10 to be detected by the photodetector 9.

The half-wave plate 3 can also be replaced by other optical components with a polarization adjustment function.

The power of the first laser 1 is much larger than that of the second laser 2 (preferably more than 10 times).

As shown in FIG. 2, the nanoparticle recognition method of the present application specifically includes the following steps:

S1, trapping laser of 1064 nm and probe laser of 532 nm are converged and irradiated into a vacuum chamber to form an optical trap and suspend the target nanoparticles to be measured;

S2, the polarization direction of the trapping laser is adjusted to make the nanoparticles rotate in the optical trap, the scattered light irradiated by the nanoparticles is filtered to remove the trapping laser of 1064 nm, and the light intensity change of the scattered light excited by the probe laser is recorded at a fixed position;

S3, according to the nanoparticle scattering model and the optical transmission efficiency of the system, the light intensity of a single nanoparticle at a fixed detection position is calculated.

1. When the error between the calculated light intensity and the actually detected scattered light intensity does not exceed 10%, the polarization direction of the trapped laser light is rotated, and the change rate of the light intensity of the scattered light of the particles does not exceed 10%, then the particle is identified as a single nanosphere, and the effective diameter of the particle is calculated by a Rayleigh scattering model.

2. When the error between the calculated light intensity and the actually detected scattered light intensity exceeds 10%, and the polarization direction of the trapped laser light is rotated, (1) if the intensity of the scattered light changes periodically with the incident polarization angle at a period of 180 degrees, and when the intensity of the scattered light is between 2 times and 8 times that of a single particle, the nanoparticles are considered as double spheres;

(2) if the intensity of the scattered light changes periodically with the incident polarization angle, and the period is not equal to 180 degrees or the intensity of the scattered light is more than 8 times of the scattered light intensity of a single sphere, the nanoparticles are considered as multiple spheres. For example, when the period is 120 degrees and the scattered light intensity is between 2 and 9 times of the scattered light intensity of a single sphere, the nanoparticles are considered as three spheres.

As shown in FIG. 3, the principle of the nanoparticle recognition method of the present application is as follows:

Because the intensity of the trapping laser is much greater than that of the probe laser, the dynamic movement of the particles is mainly influenced by the first laser 1, while the influence of the second laser 2 can be ignored. The rotation of the linear polarization direction 14 of the optical trap 12 formed by the first laser 1 drives the dipole axis of the particles to rotate, while the polarization direction of the second laser 2 is unchanged, which excites scattered light in a specific dipole direction; the light scattering of the particles to the second laser 2 changes with the change of the relative polarization direction thereof, and the particle configuration can be inverted theoretically.

A specific example is given below to illustrate the method of the present application.

Figure 4:
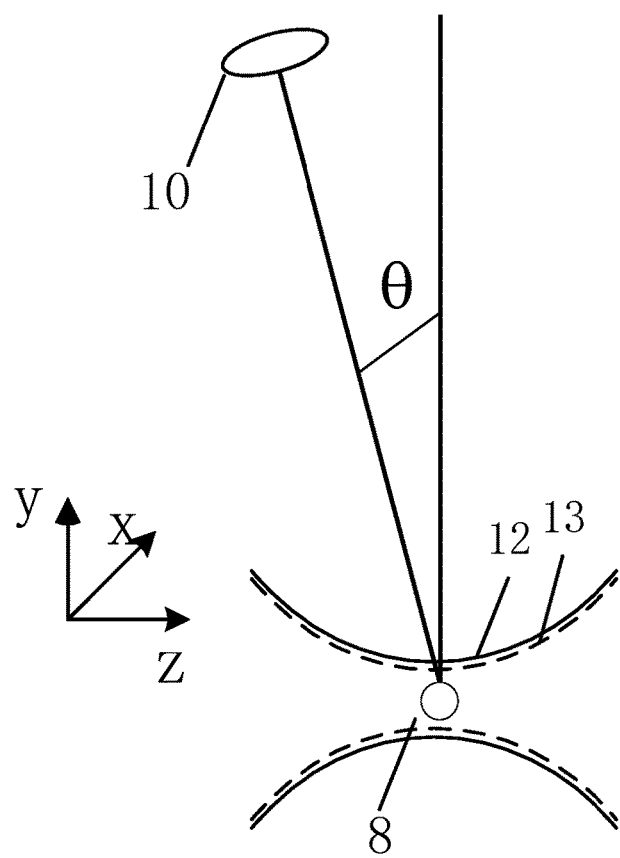
FIG. 4 is a schematic diagram of the parameter of the nanoparticle recognition method of the present application.

Assuming that the diameter of silica particles is 40 nm, far less than the wavelength of the laser, and the scattering model of nanoparticles is analyzed by the Rayleigh model, then the variation of the scattered light with the scattering angle θ is expressed as follows:

$$I_\theta = \lambda_0 I_{\frac{\pi}{2}} \cos^2\theta = \lambda_0 I_0 \frac{8\pi^4 \alpha^2}{\lambda^4 R^2} \cos^2\theta$$

where $\lambda_0$ is an optical transmission efficiency of the system, $I_0$ is the intensity of incident natural light, α is an electric polarization rate, λ is a wavelength of excited laser, R is a distance from an observation point to the nanoparticles, and θ is the scattering angle formed by the connecting line between a probe and nanoparticles and the normal of a polarization plane in an optical trap, as shown in FIG. 4. In this formula $\lambda_0$, $I_0$, R and θ are all fixed, and the change of the polarization rate α can be obtained by measuring the change of the scattered light intensity $I_0$. The electric polarization rate α is a coefficient of particles exciting the electric dipole moment and electric field in an optical trap: $\vec{P}=\alpha\vec{E}$, the value of which is related to the shape, size and dielectric properties of the particles. Under the condition of a certain volume and dielectric properties, the shape information of the particles can be obtained by the change of the scattered light with the rotation of the particles, and the number and configuration of the particles in the optical trap can be inferred from the particle size information of the nanoparticles. The specific rules are shown in step S3.

It can be understood by those skilled ink the art that what is described above is only the preferred examples of the present application, and is not intended to limit the present application. Although the present application has been described in detail with reference to the above examples, those skilled ink the art can still modify the technical solution described in the above examples or replace some of their technical features equivalently. Any modifications, equivalent replacements and the like made within the spirit and principle of the present application shall be included within the scope of protection of the present application.

What is claimed is:

1. A method for recognizing nanoparticles based on detection of scattered light with electric dipole rotation, and the method specifically comprises the following steps:
   emitting a trapping laser with a first laser;
   passing the trapping laser through a polarization modulator;
   emitting a probe laser with a second laser;
   reflecting the probe laser with a plane mirror;
   combining the probe laser and the trapping laser;
   converging trapping laser and probe laser with an objective lens located in a vacuum chamber to be irradiated into the vacuum chamber to form an optical trap for suspending target nanoparticles to be measured;
   adjusting a polarization direction of the trapping laser to make the nanoparticles rotate in the optical trap;
   filtering scattered light irradiated by the nanoparticles to remove the trapping laser, and only the scattered light excited by the second laser is recorded, and is then converged by a second objective lens to be detected by a photodetector, and a change of a scattered light intensity excited by the probe laser at a fixed position;
   according to a nanoparticle scattering model and an optical transmission efficiency of a system, if the polarization direction is changed and an error of a change rate of the light intensity of the scattered light of a particle does not exceed 10%, identifying the particle as a single sphere, and calculating an effective diameter of the particles by a Rayleigh scattering model; if the polarization direction is changed, the change rate of the light intensity of the scattered light of the particle exceeds 10%, then identifying the particles as a non-sphere, and inverting a morphology and a size of the particles according to periodic characteristics of the fluctuation of scattered light.

2. The method for recognizing nanoparticles based on detection of scattered light with electric dipole rotation according to claim 1, wherein a ratio of a power of the first laser to a power of the second laser is greater than 10.

3. The method for recognizing nanoparticles based on detection of scattered light with electric dipole rotation according to claim 1, wherein the polarization modulator is a half-wave plate, and the polarization direction of the trapping laser is adjusted by adjusting the half-wave plate.

4. The method for recognizing nanoparticles based on detection of scattered light with electric dipole rotation according to claim 1, wherein when the nanoparticles to be detected are silica particles, a wavelength of the first laser is 1064 nm and a wavelength of the second laser is 532 nm.

* * * * *